US009222590B2

(12) United States Patent
Grassl et al.

(10) Patent No.: US 9,222,590 B2
(45) Date of Patent: Dec. 29, 2015

(54) VENTILATING AND EVACUATING VALVE FOR CONDUIT PIPES AND/OR BRACES

(75) Inventors: Helmut Grassl, Traunstein (DE); Tobias Sperl, Freilassing (DE)

(73) Assignee: HAWLE Armaturen GmbH, Freilassing (DE)

( * ) Notice: Subject to any disclaimer, the term of this patent is extended or adjusted under 35 U.S.C. 154(b) by 438 days.

(21) Appl. No.: 13/606,831

(22) Filed: Sep. 7, 2012

(65) Prior Publication Data

US 2014/0060670 A1  Mar. 6, 2014

(30) Foreign Application Priority Data

Sep. 6, 2012  (DE) .......................... 10 2012 215 832

(51) Int. Cl.
| | | |
|---|---|---|
| *E03B 1/00* | (2006.01) | |
| *E03B 3/00* | (2006.01) | |
| *F16K 27/08* | (2006.01) | |
| *F16L 35/00* | (2006.01) | |
| *F16P 1/00* | (2006.01) | |
| *F17D 1/00* | (2006.01) | |

(Continued)

(52) U.S. Cl.
CPC .............. *F16K 24/02* (2013.01); *F16K 24/042* (2013.01); *F16K 31/24* (2013.01); *F16K 24/04* (2013.01); *F16K 24/044* (2013.01); *F16K 31/18* (2013.01); *F16L 55/07* (2013.01); *G05D 7/0146* (2013.01); *Y10T 137/3084* (2015.04); *Y10T 137/3099* (2015.04); *Y10T 137/7043* (2015.04); *Y10T 137/7062* (2015.04); *Y10T 137/7358* (2015.04); *Y10T 137/86734* (2015.04); *Y10T 137/86759* (2015.04); *Y10T 137/8704* (2015.04); *Y10T 137/87016* (2015.04)

(58) Field of Classification Search
CPC ....... F16K 31/24; F16K 31/18; F16K 24/044; F16K 24/04; F16L 55/07; G05D 7/0146; Y10T 137/7358; Y10T 137/7043; Y10T 137/7062; Y10T 137/3099; Y10T 137/3084; Y10T 137/86734; Y10T 137/86759; Y10T 137/8704; Y10T 137/87016
USPC ......... 137/197, 202, 377, 382, 625.3, 625.33, 137/630.19, 630.22; 251/901, 127
See application file for complete search history.

(56) References Cited

U.S. PATENT DOCUMENTS 4,586,528 A * 5/1986 Andres et al. ................. 137/202
5,172,714 A * 12/1992 Kobayashi et al. ............. 137/39

(Continued)

FOREIGN PATENT DOCUMENTS

| DE | 299 03 669 U1 | 1/1999 |
| DE | 299 05 746 U1 | 7/1999 |

(Continued)

*Primary Examiner* — Craig Schneider
*Assistant Examiner* — Kelsey Rohman
(74) *Attorney, Agent, or Firm* — Middleton Reutlinger

(57) ABSTRACT

The present invention relates to a ventilating and evacuating valve for fluid-guiding conduit pipes or braces. The valve includes a valve mechanism and a floating body which acts on the valve mechanism. The valve mechanism includes a valve body which can be moved into different opening or closing positions in order to open and close a valve outlet; a diaphragm cup; and a roll diaphragm which is arranged between the valve body and the diaphragm cup and can come to rest in different opening or closing positions over aperture openings of the valve body. The valve also includes a channelling mechanism which is configured to guide an evacuating flow past the valve mechanism.

11 Claims, 2 Drawing Sheets

Figure 1:
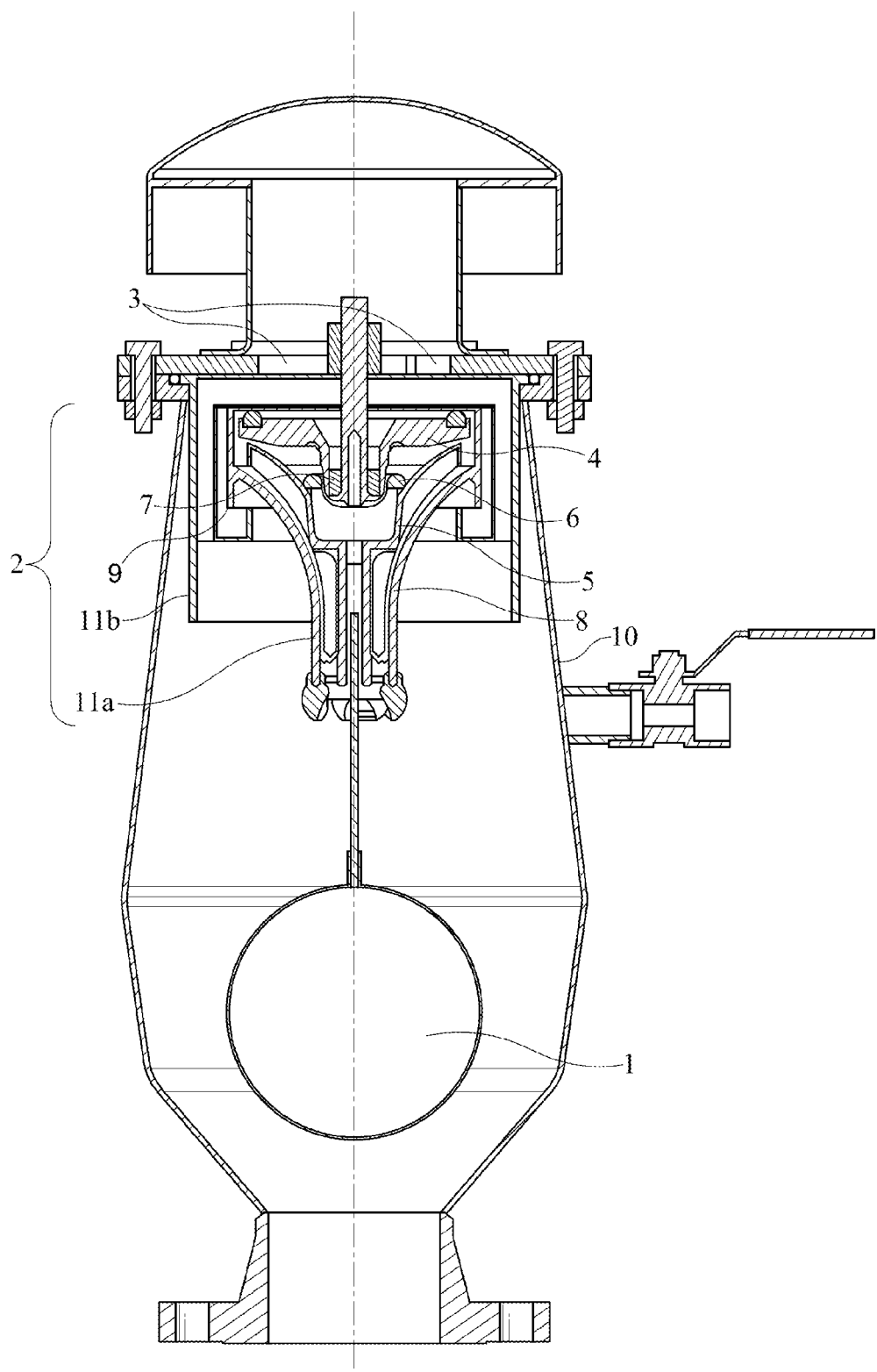

(51) Int. Cl.
*F24D 19/08* (2006.01)
*F01D 17/18* (2006.01)
*F16K 11/16* (2006.01)
*F16K 47/08* (2006.01)
*F16K 24/02* (2006.01)
*F16K 31/24* (2006.01)
*F16K 24/04* (2006.01)
*G05D 7/01* (2006.01)
*F16K 31/18* (2006.01)
*F16L 55/07* (2006.01)

(56) References Cited

U.S. PATENT DOCUMENTS 7,921,868 B2 * 4/2011 Goetzinger et al. .......... 137/202
2008/0276994 A1 11/2008 Goetzinger et al.

FOREIGN PATENT DOCUMENTS

DE  20 2009 000 710 U1  4/2009
EP  1990566 A1  11/2008

* cited by examiner

VENTILATING AND EVACUATING VALVE FOR CONDUIT PIPES AND/OR BRACES

CROSS REFERENCE TO PRIOR APPLICATION

This application is a Paris Convention filing of, currently pending, German Patent Application Serial Number 0 2012 215 832.4, filed on Sep. 6, 2012.

The invention relates to a ventilating and evacuating valve for conduit pipes and/or braces. Such ventilating and evacuating valves are used to ventilate and/or evacuate fluid-guiding conduits, in particular pressurised conduits and specifically drinking water conduits or sewerage conduits. They can be arranged at geodesic high points on the conduits themselves or on braces in the conduit system.

A ventilating and evacuating valve in accordance with the preamble of patent claim 1 is known from EP 1 990 566 A1. This valve comprises: a valve body, formed to be substantially cup-shaped and to decrease in cross-section towards the bottom, for closing and opening a valve outlet; a diaphragm cup which is assigned to a floating body of the valve; and a roll diaphragm which is arranged between the valve body and the diaphragm cup and can come to rest in different closing and/or opening positions over aperture openings of the valve body. The diaphragm body or diaphragm cup exhibits an inner contour which widens towards the top and substantially corresponds to the outer contour of the valve body.

In particular when used in sewerage conduits, there is the danger with this valve of the sensitive valve mechanism becoming functionally impaired by dirt.

It is the object of the present invention to provide a ventilating and evacuating valve which overcomes this disadvantage. The intention is in particular to provide a ventilating and evacuating valve in which the danger of the valve mechanism becoming impaired by dirt is reduced.

This object is solved by the subject matter of independent patent claim 1. The sub-claims advantageously develop the subject matter in accordance with the invention.

The ventilating and evacuating valve in accordance with the invention comprises a valve mechanism and a floating body which acts on the valve mechanism, wherein the valve mechanism comprises: a valve body which can be moved into different opening and/or closing positions in order to open and close a valve outlet; a diaphragm cup; and a roll diaphragm which is arranged between the valve body and the diaphragm cup and can come to rest in different opening and/or closing positions over aperture openings of the valve body, wherein the valve comprises a channelling means which is configured to guide an evacuating flow at least partially past the valve mechanism. Preferably, however, the entire valve mechanism lies outside the air flow when the valve is open.

In other words, the channelling means protects the valve mechanism by directing and/or diverting the air flow such that it does not flow onto the valve mechanism, i.e. the channelling means keeps the air flow away from the valve mechanism and in particular away from the roll diaphragm which is susceptible to contamination. This prevents dirt particles borne by the evacuating flow from being deposited on parts of the valve mechanism and thus able to impair its functionality.

It is conceivable for the valve mechanism to not be completely encapsulated by the channelling means; what is important is rather that the channelling means as far as possible prevents an evacuating flow from being directed onto parts of the valve mechanism. It is therefore conceivable for the channelling means to be formed solely around individual regions of the valve mechanism, as long as the flow is guided past the valve mechanism.

In accordance with a preferred embodiment of the present invention, the channelling means is also configured such that the evacuating flow is guided past the valve body in an opening position of the valve body. It is also conceivable for the evacuating flow to be guided past the valve body as soon as the latter is situated in the region of its maximum degree of opening. For this purpose, the valve body could for example be inserted into a sort of countersink provided by the channelling means.

Guiding the evacuating flow past the valve body offers another advantage, namely that a force intended to push the valve body into a closing position cannot be exerted on the valve body by the evacuating flow. In other words, the channelling means prevents the evacuating flow from exerting a dynamic pressure on the valve body.

In accordance with another preferred embodiment, the channelling means extends beyond the valve mechanism in the vertical direction, in particular beyond the valve body which is situated in an opening position. It should be pointed out at this juncture that the positional and directional specifications given in this document refer to a vertically arranged ventilating and evacuating valve, wherein the movement direction of the valve body, like the main flow direction of the evacuating flow, extends vertically within the valve. If the valve in accordance with the invention is configured differently, these specifications should of course be adjusted accordingly. If the channelling means extends vertically beyond the valve mechanism and/or valve body, it is impossible for a vertically extending evacuating flow to flow onto the valve mechanism or the valve body which is situated in an opening position, in particular when the channelling means is formed such that it is closed at the bottom, i.e. in a direction counter to the evacuating flow in the valve.

It is also conceivable for the channelling means to circumferentially surround the valve mechanism, in particular the valve body which is situated in an opening position, as viewed in the vertical direction. A particularly preferred channelling means forms a hollow body, in particular a hollow body which is open towards the top, which accommodates and in particular mounts the valve mechanism, in particular the valve body which is situated in an opening position. Such a channelling means thus forms a sort of cup, the upper rim of which extends beyond the upper edge of the valve mechanism and in particular beyond the upper edge of a valve body which is situated in an opening position. Such a channelling means thus forms a sort of receptacle for the valve mechanism and the valve body which is situated in an opening position.

The shape which the channelling means and/or the hollow body formed by the channelling means exhibits on an outer side, i.e. on a side pointing away from the valve mechanism, is primarily irrelevant to the function of protecting the valve mechanism and the valve body. In the interests of a streamlined configuration of the ventilating and evacuating valve, however, it is advantageous if the cross-section of the channelling means and/or hollow body decreases towards the bottom, i.e. counter to the direction of the evacuating flow.

It is also possible for the channelling means to comprise at least a portion, in particular a collar, which extends from the channelling means on towards the bottom and can also circumferentially encircle the channelling means. Such portions and/or collars offer additional protection against dirt borne by the evacuating flow.

In accordance with another preferred embodiment, the channelling means comprises two substantially opposing encircling walls which delineate an annular space for guiding the evacuating flow, i.e. in other words, the evacuating flow is channelled through an annular channel, wherein the valve mechanism and as applicable also the valve body is situated within the ring, protected from the flow. The annular space can thus be configured such that the evacuating flow is widened by the inner wall, in order to create space for the valve mechanism and the valve body. Once the valve mechanism and a valve body which is situated in the opening position have been passed, in the vertical direction, by the evacuating flow, the latter can then be reconverged in the horizontal direction.

It is conceivable for the channelling means to be fixedly fastened to a housing part of the valve. In other words, the channelling means can be connected to a housing part of the valve in a positive fit or frictional fit and assume a non-variable position in it.

It is also conceivable for the channelling means to be configured such that it can be inserted into the valve housing in the region of the valve outlet, wherein it is in particular preferred if it is inserted into the valve housing from above. It is therefore even conceivable to add a channelling means in accordance with the invention to existing ventilating and evacuating valves, in order to protect their valve mechanism and valve body.

Figure 2:
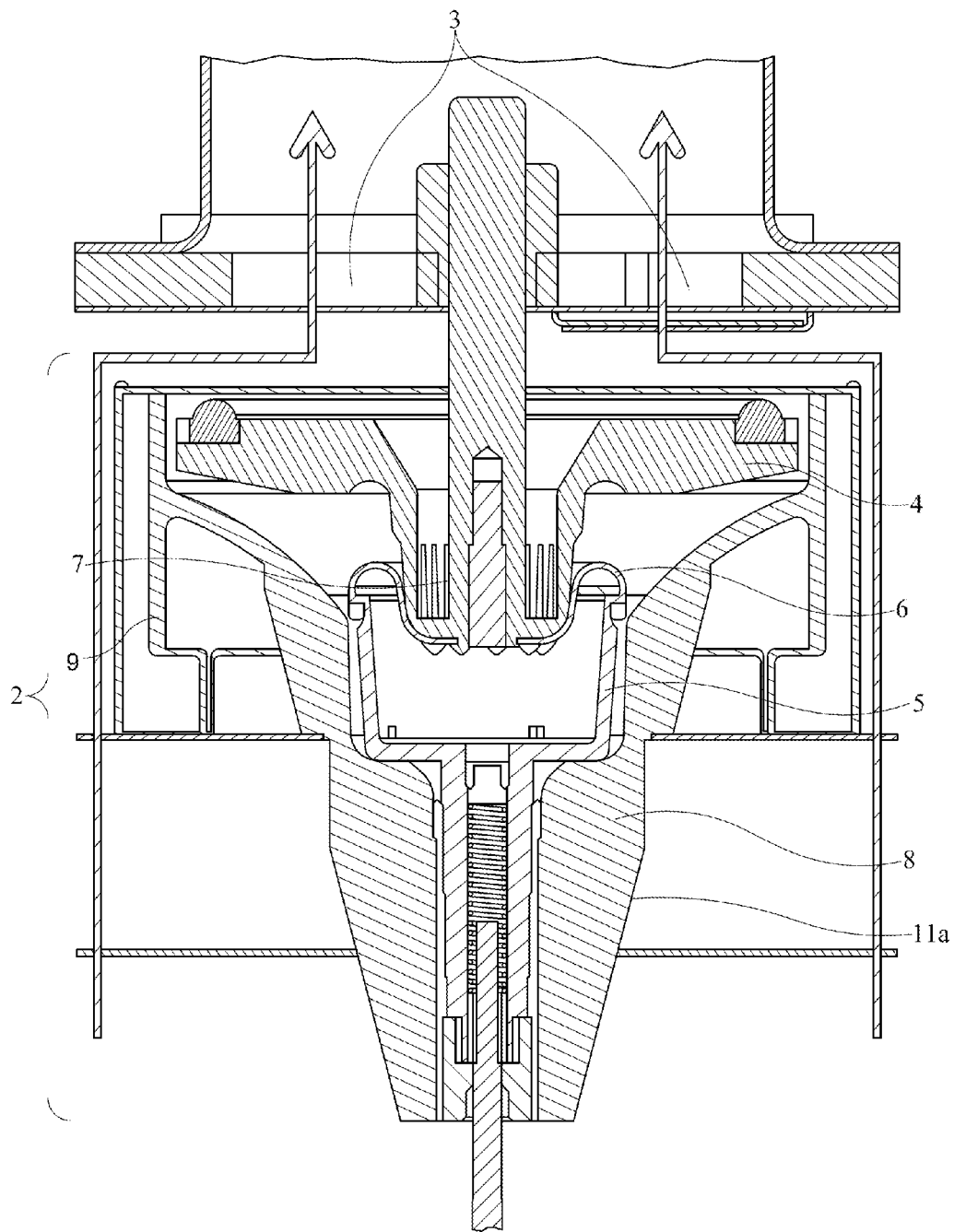

The invention is described below in more detail on the basis of preferred embodiments and by referring to the enclosed figures. It can include any of the features described here, individually and in any expedient combination. There is shown:

FIG. 1 a ventilating and evacuating valve in accordance with the invention;

FIG. 2 an enlarged view of a channelling means in accordance with the present invention.

A ventilating and evacuating valve in accordance with the invention is shown in FIG. 1. It comprises a valve housing 10 which comprises a screwed-on lid, including a valve outlet 3, at the top. A saucer-shaped valve body 4 is arranged below the valve outlet 3 and guided in a guide in the lid and circumferentially seals the valve outlet 3 by means of an annular gasket (not indicated) in a closed position.

The valve body 4 is embodied to be substantially cup-shaped and exhibits an outer contour which tapers downwards in the shape of a truncated cone and in which aperture openings 7 are provided which in this case are shaped as longitudinal slits distributed on the circumference.

The floating body 1 is connected to a floating body guiding rod and therefore mounted such that it can be shifted up and down. The floating body guiding rod is in turn connected by means of a spring to a diaphragm cup 5 which comprises an upwardly protruding rim. A roll diaphragm 6 is fastened to the outer side of this rim, from which it extends downwards over the outer contour of the valve body 4 and can therefore close the aperture openings 7, depending on the position in which the valve body 4 is situated relative to the diaphragm cup 5.

In the (open) position of the valve body 4 shown in FIG. 1, air can exit the valve through both the aperture openings 7 and an additional, substantially larger aperture opening valve outlet 3 formed between the valve body 4 and the lid of the valve. If there is a relatively high level of fluid in the interior space of the valve, the floating body 1 presses the roll diaphragm 6 onto the valve body 4 by means of the floating body guiding rod, such that the roll diaphragm 6 is pressed against the aperture openings 7 and closes them. A force of the floating body 1 exerted further upwards closes the gap between the annular gasket on the valve body 4 and the valve lid and therefore also the outlet 3.

When the level of fluid in the housing drops, the floating body 1 is moved downwards by gravity, and the valve assumes a "half-open" state. Since it is fastened to the outside of the diaphragm cup 5, the roll diaphragm 6 is drawn downwards and rolls off over the outer contour of the valve body 4, wherein the aperture openings 7 are non-incrementally and gradually exposed, such that air can pass through.

When the housing is largely empty and the entire weight of the floating body 1 together with the diaphragm cup 5 therefore comes to bear and the force of the weight of the floating body 1 and the diaphragm cup 5 is greater than the pressing force generated by the interior pressure in the valve, the second valve stage is opened, i.e. the valve body 4 detaches from the valve body seating on the valve lid. This exposes an additional large evacuating cross-section valve outlet 3, and air can additionally flow out past the valve gasket via the annular gap formed.

If water then flows into the interior of the housing, this raises the floating body 1 together with the diaphragm cup 5, wherein the increasing interior pressure presses the valve body 4 upwards and its gasket onto its seating. During this process, the conduit can be evacuated very rapidly through the gap between the valve body 4 and the valve body seating. Once the valve body gasket has established a seal, the roll diaphragm 6 can resume non-incremental evacuation, by rolling off over the outer contour of the valve body 4 and exposing the radially arranged aperture openings 7 to a greater or lesser degree.

FIG. 1 also shows a channelling means 8, of which an outwardly directed inner wall 11a and an inwardly directed outer wall 11b form an annular space through which air is channelled past the valve mechanism 2 and the valve body 4 which is situated in an opening position, and can exit the valve housing 10 through a valve outlet 3.

The outer wall 11b itself then forms a downwardly directed collar, wherein such a collar (reference sign 9) is also formed in the upper third of the inner wall 11a. These collars form dirt repellers which effectively retain dirt borne by the evacuating flow. It is also shown that the channelling means 8 can be inserted into the valve housing 10 from above and is held in position in a positive fit between the lid and the upper housing part 10 by means of a screwed-on lid.

FIG. 2 shows another embodiment of the present invention, wherein only the outer contour and/or wall 11a of the channelling means 8 differs with respect to the embodiment shown in FIG. 1. The course of the evacuating flow can also be gathered from the arrows indicated in FIG. 2. The evacuating flow is channelled around the valve mechanism 2 and the valve body 4 in an open position by means of the outwardly directed inner wall 11a, wherein dirt particles are reliably retained on the downwardly directed collar 9.

As soon as the evacuating flow has passed the upper edge of the outwardly directed inner wall 11a, it is diverted inwards and parallel to the upper side of the saucer-shaped valve body 4 and can exit the valve housing 10 through the valve outlet 3.

The invention claimed is:

1. A ventilating and evacuating valve for fluid-guiding conduit pipes and/or braces, comprising:
 a valve housing that accommodates a valve mechanism and a floating body which acts on the valve mechanism,
 wherein the valve mechanism comprises:
 a valve body which can be moved into different opening and/or closing positions in order to open and close a valve outlet;
 a diaphragm cup; and a roll diaphragm which is arranged between the valve body and the diaphragm cup and can come to rest in different opening and/or closing positions over aperture openings of the valve body, wherein the valve also comprises a channelling means which is configured to guide an entire evacuating flow past the valve mechanism, wherein the channelling means assumes a non-variable position in the valve housing and extends beyond the valve mechanism in a vertical direction.

2. The ventilating and evacuating valve in accordance with claim 1, wherein the channelling means is configured to guide the evacuating flow past the valve body which is situated in an opening position.

3. The ventilating and evacuating valve in accordance with claim 1, wherein the channelling means circumferentially surrounds the valve mechanism, in particular the valve body which is situated in an opening position, as viewed in the vertical direction.

4. The ventilating and evacuating valve in accordance with claim 1, wherein the channelling means forms a hollow body, in particular a hollow body which is open towards the top, which accommodates and in particular mounts the valve mechanism, in particular the valve body which is situated in an opening position.

5. The ventilating and evacuating valve in accordance with claim 1, wherein the cross-section of the channelling means and/or hollow body decreases towards the bottom.

6. The ventilating and evacuating valve in accordance with claim 1, wherein the channelling means comprises at least a portion, in particular an encircling collar, which extends from the channelling means on downwards.

7. The ventilating and evacuating valve in accordance with claim 1, wherein the channelling means comprises two substantially opposing encircling walls which delineate an annular space for guiding the evacuating flow.

8. The ventilating and evacuating valve in accordance with claim 1, wherein the channelling means is configured to be fastened, spatially fixed, to a housing part of the valve.

9. The ventilating and evacuating valve in accordance with claim 1, wherein the channelling means is configured such that it can be inserted into the valve housing in the region of the valve outlet, in particular from above.

10. A ventilating and evacuating valve, comprising:
a valve and a floating body which acts on the valve,
wherein the valve includes
a valve body which can be actuated between a different opening and a closing position in order to open and close a valve outlet; a diaphragm cup; and
a roll diaphragm positioned between the valve body and the diaphragm cup,
the roll diaphragm positionable into different opening and closing positions over a plurality of aperture openings of the valve body,
wherein the valve also includes a channel structure to guide an entire evacuating flow past the valve, the channel structure assuming a non-variable position in the valve housing and extending beyond the valve mechanism in a vertical direction.

11. A ventilating and evacuating valve, comprising:
a valve and a floating body which acts on the valve,
wherein the valve includes
a valve body which can be actuated between a different opening and a closing position in order to open and close a valve outlet; a diaphragm cup;
a roll diaphragm positioned between the valve body and the diaphragm cup,
the roll diaphragm positionable into different opening and closing positions over a plurality of aperture openings of the valve body;
a channel structure to guide an entire evacuating flow past the valve, the channel structure assuming a non-variable position in the valve housing and extending beyond the valve mechanism in a vertical direction; and
further including an outwardly directed inner wall and inwardly directed outer wall forming an annular space through which the evacuating flow is channeled past the valve and past the plurality of aperture openings of the valve body.

* * * * *